US008500316B2

(12) United States Patent
Hisayasu et al.

(10) Patent No.: US 8,500,316 B2
(45) Date of Patent: Aug. 6, 2013

(54) SELF-BALLASTED LAMP AND LIGHTING EQUIPMENT

(75) Inventors: Takeshi Hisayasu, Yokosuka (JP); Keisuke Ono, Yokosuka (JP)

(73) Assignees: Toshiba Lighting & Technology Corporation, Kanagawa (JP); Kabushiki Kaisha Toshiba, Tokyo (JP)

( * ) Notice: Subject to any disclaimer, the term of this patent is extended or adjusted under 35 U.S.C. 154(b) by 190 days.

(21) Appl. No.: 13/034,959

(22) Filed: Feb. 25, 2011

(65) Prior Publication Data

US 2011/0210664 A1 Sep. 1, 2011

(30) Foreign Application Priority Data

Feb. 26, 2010 (JP) ................................ 2010-042528

(51) Int. Cl.
*B60Q 1/00* (2006.01)

(52) U.S. Cl.
USPC ...................................... 362/547; 362/249.02

(58) Field of Classification Search
USPC .................... 362/226, 231, 249.02, 251, 294, 362/547, 555, 800, 806
See application file for complete search history.

(56) References Cited

U.S. PATENT DOCUMENTS

| | | | |
|---|---|---|---|
| 1,972,790 | A | 9/1934 | Olley |
| 4,355,853 | A | 10/1982 | Kourimsky |
| 4,503,360 | A | 3/1985 | Bedel |
| 4,630,182 | A | 12/1986 | Moroi |
| 4,939,420 | A | 7/1990 | Lim |
| 5,323,271 | A | 6/1994 | Shimada |
| 5,327,332 | A | 7/1994 | Hafemeister |
| D356,107 | S | 3/1995 | Watanabe et al. |
| 5,537,301 | A | 7/1996 | Martich |
| 5,556,584 | A | 9/1996 | Yamazaki |
| 5,585,697 | A | 12/1996 | Cote |
| 5,607,228 | A | 3/1997 | Ozaki et al. |
| 5,632,551 | A | 5/1997 | Roney |

(Continued)

FOREIGN PATENT DOCUMENTS

| | | |
|---|---|---|
| CN | 1264152 | 8/2000 |
| CN | 1380704 | 11/2002 |

(Continued)

OTHER PUBLICATIONS

English Language Abstract of JP 2001-243809, published Sep. 7, 2001.

(Continued)

*Primary Examiner* — Tung X Le
(74) *Attorney, Agent, or Firm* — DLA Piper LLP (US)

(57) ABSTRACT

According to one embodiment, a self-ballasted lamp includes a light-emitting module, a base body, a first insulating member, a screw, a second insulating member, a cap and a lighting circuit. The light-emitting module has a light-emitting portion including semiconductor light-emitting elements mounted on a surface of a metallic substrate. The base body is made of metal and the light-emitting module is arranged on one end side of the base body. The first insulating member is interposed between the substrate of the light-emitting module and the base body. The substrate of the light-emitting module is fixed to the base body with the screws. The second insulating member is interposed between the screws and the substrate of the light-emitting module. The cap is provided at the other end side of the base body. The lighting circuit is housed inside the base body.

13 Claims, 6 Drawing Sheets

(56) References Cited

U.S. PATENT DOCUMENTS

| | | | | |
|---|---|---|---|---|
| 5,685,628 | A | 11/1997 | Feger et al. | |
| 5,775,792 | A | 7/1998 | Wiese | |
| 5,785,418 | A | 7/1998 | Hochstein | |
| 5,857,767 | A | 1/1999 | Hochstein | |
| 5,947,588 | A | 9/1999 | Huang | |
| 6,095,668 | A | 8/2000 | Rykowski et al. | |
| 6,111,359 | A | 8/2000 | Work et al. | |
| 6,161,910 | A | 12/2000 | Reisenauer | |
| 6,186,646 | B1 | 2/2001 | Wiedemer | |
| 6,220,722 | B1 * | 4/2001 | Begemann | 362/231 |
| 6,227,679 | B1 | 5/2001 | Zhang et al. | |
| 6,234,649 | B1 | 5/2001 | Katougi | |
| 6,294,973 | B1 | 9/2001 | Kimura | |
| 6,502,968 | B1 | 1/2003 | Simon | |
| 6,517,217 | B1 | 2/2003 | Liao | |
| 6,525,668 | B1 | 2/2003 | Petrick | |
| 6,598,996 | B1 | 7/2003 | Lodhie | |
| 6,641,283 | B1 | 11/2003 | Bohler | |
| 6,787,999 | B2 | 9/2004 | Stimac et al. | |
| 6,793,374 | B2 * | 9/2004 | Begemann | 362/294 |
| D497,439 | S | 10/2004 | Shaw et al. | |
| 6,814,470 | B2 | 11/2004 | Rizkin et al. | |
| 6,936,855 | B1 | 8/2005 | Harrah | |
| 6,948,829 | B2 * | 9/2005 | Verdes et al. | 362/227 |
| 6,982,518 | B2 | 1/2006 | Chou et al. | |
| 7,059,748 | B2 | 6/2006 | Coushaine | |
| 7,074,104 | B2 | 7/2006 | Itaya | |
| 7,111,961 | B2 | 9/2006 | Trenchard | |
| 7,125,146 | B2 | 10/2006 | Willis | |
| 7,144,140 | B2 | 12/2006 | Sun et al. | |
| D534,665 | S | 1/2007 | Egawa et al. | |
| D535,038 | S | 1/2007 | Egawa et al. | |
| 7,157,746 | B2 | 1/2007 | Ota | |
| 7,165,866 | B2 | 1/2007 | Li | |
| 7,198,387 | B1 | 4/2007 | Gloisten et al. | |
| 7,226,189 | B2 | 6/2007 | Lee et al. | |
| 7,281,818 | B2 | 10/2007 | You | |
| 7,300,173 | B2 | 11/2007 | Catalano | |
| 7,329,024 | B2 | 2/2008 | Lynch | |
| 7,331,689 | B2 | 2/2008 | Chen | |
| 7,347,589 | B2 | 3/2008 | Ge | |
| 7,396,146 | B2 | 7/2008 | Wang | |
| 7,431,477 | B2 | 10/2008 | Chou et al. | |
| 7,497,596 | B2 | 3/2009 | Ge | |
| 7,625,104 | B2 | 12/2009 | Zhang et al. | |
| 7,631,987 | B2 | 12/2009 | Wei | |
| 7,679,096 | B1 | 3/2010 | Ruffin | |
| 7,744,256 | B2 | 6/2010 | Smester | |
| 7,824,075 | B2 | 11/2010 | Maxik | |
| 7,918,587 | B2 | 4/2011 | Hsu et al. | |
| 7,919,339 | B2 | 4/2011 | Hsu | |
| 7,947,596 | B2 | 5/2011 | Takeda | |
| 7,963,686 | B2 | 6/2011 | Hu | |
| 8,058,782 | B2 | 11/2011 | Lai | |
| 8,058,784 | B2 | 11/2011 | Treurniet | |
| 8,066,417 | B2 | 11/2011 | Balazs | |
| 8,072,130 | B2 | 12/2011 | Wang et al. | |
| 8,157,418 | B2 | 4/2012 | Kraus | |
| 8,226,270 | B2 | 7/2012 | Yamamoto et al. | |
| 2002/0012246 | A1 | 1/2002 | Rincover et al. | |
| 2002/0024814 | A1 | 2/2002 | Matsuba | |
| 2002/0097586 | A1 | 7/2002 | Horowitz | |
| 2002/0118538 | A1 | 8/2002 | Calon et al. | |
| 2002/0145152 | A1 | 10/2002 | Shimomura | |
| 2002/0195918 | A1 | 12/2002 | Matsuba et al. | |
| 2003/0063476 | A1 | 4/2003 | English et al. | |
| 2003/0117797 | A1 | 6/2003 | Sommers et al. | |
| 2003/0117801 | A1 | 6/2003 | Lin | |
| 2003/0137838 | A1 | 7/2003 | Rizkin et al. | |
| 2003/0151917 | A1 | 8/2003 | Daughtry | |
| 2004/0012955 | A1 | 1/2004 | Hsieh | |
| 2004/0109310 | A1 | 6/2004 | Galli | |
| 2004/0120156 | A1 | 6/2004 | Ryan | |
| 2004/0145898 | A1 | 7/2004 | Ase et al. | |
| 2004/0156191 | A1 | 8/2004 | Biasoli | |
| 2004/0023815 | A1 | 11/2004 | Tomuoshi et al. | |
| 2004/0218385 | A1 | 11/2004 | Tomiyoshi | |
| 2005/0007772 | A1 | 1/2005 | Yen | |
| 2005/0024864 | A1 | 2/2005 | Galli | |
| 2005/0068776 | A1 | 3/2005 | Ge | |
| 2005/0073244 | A1 | 4/2005 | Chou et al. | |
| 2005/0111234 | A1 | 5/2005 | Martin et al. | |
| 2005/0162864 | A1 | 7/2005 | Verdes et al. | |
| 2005/0174769 | A1 | 8/2005 | Yong | |
| 2005/0243552 | A1 | 11/2005 | Maxik | |
| 2005/0254246 | A1 | 11/2005 | Huang | |
| 2006/0034077 | A1 | 2/2006 | Chang | |
| 2006/0043546 | A1 | 3/2006 | Kraus | |
| 2006/0092640 | A1 | 5/2006 | Li | |
| 2006/0193130 | A1 | 8/2006 | Ishibashi | |
| 2006/0193139 | A1 | 8/2006 | Sun | |
| 2006/0198147 | A1 | 9/2006 | Ge | |
| 2006/0215408 | A1 | 9/2006 | Lee | |
| 2006/0219428 | A1 | 10/2006 | Chinda et al. | |
| 2006/0227558 | A1 | 10/2006 | Osawa | |
| 2006/0239002 | A1 | 10/2006 | Chou et al. | |
| 2007/0002570 | A1 | 1/2007 | Souza | |
| 2007/0041182 | A1 | 2/2007 | Ge et al. | |
| 2007/0096114 | A1 | 5/2007 | Aoki | |
| 2007/0103904 | A1 | 5/2007 | Chen | |
| 2007/0247840 | A1 | 10/2007 | Ham | |
| 2007/0279903 | A1 | 12/2007 | Negley | |
| 2007/0285926 | A1 | 12/2007 | Maxik | |
| 2008/0002100 | A1 | 1/2008 | Kaneko | |
| 2008/0006911 | A1 | 1/2008 | Nakahara et al. | |
| 2008/0037255 | A1 | 2/2008 | Wang | |
| 2008/0080187 | A1 | 4/2008 | Purinton | |
| 2008/0084701 | A1 | 4/2008 | Van De Ven | |
| 2008/0112170 | A1 | 5/2008 | Trott | |
| 2008/0130298 | A1 | 6/2008 | Negley | |
| 2008/0173883 | A1 | 7/2008 | Hussell | |
| 2008/0224608 | A1 | 9/2008 | Konishi | |
| 2008/0289867 | A1 | 11/2008 | Owens | |
| 2009/0059595 | A1 | 3/2009 | Ge | |
| 2009/0116229 | A1 | 5/2009 | Dalton | |
| 2009/0116231 | A1 | 5/2009 | Miller | |
| 2009/0161356 | A1 | 6/2009 | Negley | |
| 2009/0175041 | A1 | 7/2009 | Yuen et al. | |
| 2009/0184616 | A1 | 7/2009 | Van de Ven | |
| 2009/0184646 | A1 | 7/2009 | Devaney | |
| 2009/0207602 | A1 | 8/2009 | Reed | |
| 2009/0294780 | A1 | 12/2009 | Chou | |
| 2009/0315442 | A1 | 12/2009 | Rooymans | |
| 2010/0026157 | A1 | 2/2010 | Tanaka | |
| 2010/0060130 | A1 | 3/2010 | Li | |
| 2010/0067241 | A1 | 3/2010 | Lapatovich | |
| 2010/0096992 | A1 | 4/2010 | Yamamoto | |
| 2010/0207534 | A1 | 8/2010 | Dowling | |
| 2010/0277082 | A1 | 11/2010 | Reed | |
| 2010/0287652 | A1 | 11/2010 | Popi | |
| 2010/0289396 | A1 | 11/2010 | Osawa | |
| 2010/0313983 | A1 | 12/2010 | Aoki | |
| 2011/0043120 | A1 * | 2/2011 | Panagotacos et al. | 315/224 |
| 2011/0050133 | A1 * | 3/2011 | Grajcar et al. | 315/307 |
| 2011/0079814 | A1 | 4/2011 | Chen | |
| 2011/0084956 | A1 | 4/2011 | Choi | |
| 2011/0090691 | A1 | 4/2011 | Markle et al. | |
| 2011/0139491 | A1 | 6/2011 | Chang | |
| 2011/0299695 | A1 | 12/2011 | Nicholson | |

FOREIGN PATENT DOCUMENTS

| | | |
|---|---|---|
| CN | 1433070 | 7/2003 |
| CN | 1644978 | 7/2005 |
| CN | 1880844 | 12/2006 |
| CN | 201014266 | 1/2008 |
| CN | 201081193 | 7/2008 |
| CN | 101307887 | 11/2008 |
| CN | 201180976 | 1/2009 |
| CN | 101506934 | 8/2009 |
| CN | 101521140 | 9/2009 |
| CN | 101639170 | 2/2010 |
| DE | 10 2004 042186 | 3/2006 |
| DE | 20 2008 016 231 | 4/2009 |
| DE | 20 2008 016 868 | 4/2009 |

| | | |
|---|---|---|
| EP | 1 215 735 | 6/2002 |
| EP | 1705421 | 9/2006 |
| EP | 2037633 | 3/2009 |
| EP | 2149742 | 2/2010 |
| EP | 2 163 808 | 3/2010 |
| JP | 57-152706 | 9/1982 |
| JP | 59-035303 | 2/1984 |
| JP | 61-35216 | 2/1986 |
| JP | 62-190366 | 12/1987 |
| JP | 63-5581 | 1/1988 |
| JP | 63-102265 | 5/1988 |
| JP | 64-7204 | 1/1989 |
| JP | 1-206505 | 8/1989 |
| JP | 2-91105 | 3/1990 |
| JP | 2000-083343 | 3/2000 |
| JP | 2000-173303 | 6/2000 |
| JP | 2001-243809 | 9/2001 |
| JP | 2002-093206 | 3/2002 |
| JP | 2002-525814 | 8/2002 |
| JP | 2002-280617 | 9/2002 |
| JP | 2003-016808 | 1/2003 |
| JP | 2003-051209 | 2/2003 |
| JP | 2003-059305 | 2/2003 |
| JP | 2003-59330 | 2/2003 |
| JP | 2003-92022 | 3/2003 |
| JP | 2004-6096 | 1/2004 |
| JP | 2004-119078 | 4/2004 |
| JP | 2004-193053 | 7/2004 |
| JP | 2004-221042 | 8/2004 |
| JP | 2005-93097 | 4/2005 |
| JP | 2005-123200 | 5/2005 |
| JP | 2005-513815 | 5/2005 |
| JP | 2005-166578 | 6/2005 |
| JP | 2005-217354 | 8/2005 |
| JP | 2005-286267 | 10/2005 |
| JP | 2006-040727 | 2/2006 |
| JP | 3121916 | 5/2006 |
| JP | 2006-156187 | 6/2006 |
| JP | 2006-244725 | 9/2006 |
| JP | 2006-286461 | 10/2006 |
| JP | 2006-310057 | 11/2006 |
| JP | 2006-313717 | 11/2006 |
| JP | 2006-313718 | 11/2006 |
| JP | 2007-073306 | 3/2007 |
| JP | 2007-073478 | 3/2007 |
| JP | 2007-188832 | 7/2007 |
| JP | 2007-207576 | 8/2007 |
| JP | 2008-027910 | 2/2008 |
| JP | 2008-91140 | 4/2008 |
| JP | 2008-227412 | 9/2008 |
| JP | 2008-277561 | 11/2008 |
| JP | 2009-37995 | 2/2009 |
| JP | 2009-117342 | 5/2009 |
| JP | 2009-135026 | 6/2009 |
| JP | 2009-164157 | 7/2009 |
| JP | 2009-206104 | 8/2009 |
| JP | 2010-040223 | 2/2010 |
| WO | WO 03/056636 | 7/2003 |
| WO | WO 2005/024898 | 3/2005 |
| WO | WO 2006/118457 | 11/2006 |
| WO | WO 2008/146694 | 12/2008 |
| WO | WO2009/085231 | 7/2009 |
| WO | WO 2009/087897 | 7/2009 |

OTHER PUBLICATIONS

English Language Abstract of JP Publication 01-206505 published Aug. 18, 1989.

English Language Abstract of JP Publication 2005-093097 published Apr. 7, 2005.

English Language Abstract of JP Publication 2005-123200 published May 12, 2005.

English Language Abstract of JP 2006-313718, published Nov. 16, 2006.

English Language Abstract of JP Publication 63-005581 published Jan. 11, 1988.

English Language Abstract of JP Publication 64-007402 published Jan. 11, 1989.

English Language Machine Translation of JP 2000-083343, published Mar. 21, 2000.

English Language Machine Translation of JP 2000-173303 published Jun. 23, 2000.

English Language Machine Translation of JP 2001-243809, published Sep. 7, 2001.

English Language Machine translation of JP 2003-59330 published Feb. 28, 2003.

English Language Machine Translation of JP 2004-006096 published Jan. 8, 2004.

English Language Machine Translation of JP 2004-193053 published Jul. 8, 2004.

English Language Machine Translation of JP 2005-166578 published Jun. 23, 2005.

English Language Machine translation of JP 2005-513815 published May 12, 2005.

English Language Machine translation of JP 2006-040727 published Feb. 9, 2006.

English Language Machine Translation of JP 2006-310057, published Nov. 9, 2006.

English Language Machine Translation of JP 2006-313718, published Nov. 16, 2006.

English Language Machine translation of JP 2008-91140 published Apr. 17, 2008.

English Language Machine Translation of JP 2009-37995, published Feb. 19, 2009.

English Language Machine Translation of JP 3121916, published May 10, 2006.

English Language Machine Translation of JP Publication 2005-093097 published Apr. 7, 2005.

English Language Machine Translation of JP Publication 2005-123200 published May 12, 2005.

English Language Machine translation of JP-2002-280617published Sep. 27, 2002.

English Language Machine translation of JP-2005-286267 published Oct. 13, 2005.

English Language Machine translation of JP-2006-244725 published Sep. 14, 2006.

English Language Machine Translation ofJP 2003-092022 published Mar. 28, 2003.

English Language Translation of Office Action issued in corresponding Japanese Appl 2005-221571 on Oct. 20, 2009.

English Language Translation of International Search Report for PCT/JP2008/073436 mailed Mar. 24, 2009.

English translation of Office Action issued in corresponding Japanese Appl 2005-221571 on Jul. 7, 2009.

English translation of Office Action issued in corresponding Japanese Appl 2005-221571 on Aug. 25, 2009.

English Language Translation of Office Action issued in Japanese Appl 2005-221688 on Jan. 26, 2010.

Machine English language translation of JP-2003-016808 published Jan. 17, 2003.

Office Action issued in corresponding Japanese Appl 2005-221571 on Jul. 7, 2009.

Office Action issued in corresponding Japanese Appl 2005-221571 on Aug. 25, 2009.

Office Action issued in corresponding Japanese Appl 2005-221571 on Oct. 20, 2009.

Search Report of International Application No. PCT/JP2008/068625 mailed Dec. 9, 2008.

English Language Abstract of JP 2004-193053 published Jul. 8, 2004.

English Language Abstract of JP 2-91105 published Mar. 30, 1990.

English Language Abstract of JP 2000-173303 published Jun. 23, 2000.

English Language Abstract of JP 2003-092022 published Mar. 28, 2003.

English language abstract of JP-2002-280617 published Sep. 27, 2002.

English language abstract of JP-2003-016808 published Jan. 17, 2003.

English Language Abstract of 2003-59330 published Feb. 28, 2003.

English Language Abstract of JP 2005-166578 published Jun. 23, 2005.
English language abstract of JP-2005-286267 published Oct. 13, 2005.
English Language Abstract of JP 2006-040727 published Feb. 9, 2006.
English language abstract of JP-2006-244725 published Sep. 14, 2006.
English Language Abstract of JP 2008-91140 published Apr. 17, 2008.
English Language Abstract of JP 2004-006096 published Jan. 8, 2004.
Office Action issued in Japanese Appl 2005-221688 on Jan. 26, 2010.
English Language Abstract of JP 2009-37995, published Feb. 19, 2009.
English Language Abstract of JP 2000-083343, published Mar. 21, 2000.
English Language Abstract of JP 57-152706 published Sep. 21, 1982.
English Language Abstract of JP 2006-310057, published Nov. 9, 2006.
International Preliminary Report on Patentability and Written Opinion issued in PCT/JP2008/068625 mailed May 11, 2010.
Office Action issued in Japanese Appl 2005-371406 on Apr. 20, 2010.
English Translation of Office Action issued in Japanese Appl 2005-371406 on Apr. 20, 2010.
Related U.S. Appl. No. 12/825,650 captured on Aug. 1, 2001.
Related U.S. Appl. No. 12/794,379 captured on Aug. 1, 2011.
Related U.S. Appl. No. 12/794,429 captured on Aug. 1, 2011.
Related U.S. Appl. No. 12/794,476 captured on Aug. 1, 2011.
Related U.S. Appl. No. 12/794,509 captured on Aug. 1, 2011.
Related U.S. Appl. No. 12/794,558 captured on Aug. 1, 2011.
Related U.S. Appl. No. 12/811,795 captured on Aug. 1, 2011.
Related U.S. Appl. No. 12/738,081 captured on Aug. 1, 2011.
Related U.S. Appl. No. 12/713,230 captured on Aug. 1, 2011.
Related U.S. Appl. No. 12/825,956 captured on Aug. 1, 2011.
Japanese Office Action issued in JP 2008-198625 on May 26, 2010.
English Translation of Japanese Office Action issued in JP 2008-198625 on May 26, 2010.
Amendment filed in JP 2008-198625 on Jun. 28, 2010.
English Translation of Amendment filed in JP 2008-198625 on Jun. 28, 2010.
English Language Abstract of JP 2006-313717 published Nov. 16, 2006.
Machine English Translation of JP 2006-313717 published Nov. 16, 2006.
English Language Abstract of JP 2009-135026 published Jun. 18, 2009.
English Language Translation of JP 2009-135026 published Jun. 18, 2009.
English Language Abstract of JP 2002-525814 published Aug. 13, 2002.
English Language Translation of JP 2002-525814 published Aug. 13, 2002.
English Language Abstract of JP 2003-059305 published Feb. 28, 2003.
English Language Translation of JP 2003-059305 published Feb. 28, 2003.
English Language Abstract of JP 2007-188832 published Jul. 26, 2007.
English Language Translation of JP 2007-188832 published Jul. 26, 2007.
English Language Abstract of JP 2008-027910 published Feb. 7, 2008.
English Language Translation of JP 2008-027910 published Feb. 7, 2010.
English Language Abstract of JP 2007-207576 published Aug. 16, 2007.
English Language Translation of JP 2007-207576 published Aug. 16, 2007.
English Language Abstract of JP 2007-073306 published Mar. 22, 2007.
English Language Translation of JP 2007-073306 published Mar. 22, 2007.
U.S. Appl. No. 12/880,490 electronically captured on Aug. 1, 2011.
U.S. Appl. No. 12/845,330 electronically captured on Aug. 1, 2011.
U.S. Appl. No. 12/885,005 electronically captured on Aug. 1, 2011.
U.S. Appl. No. 12/933,969 electronically captured on Aug. 1, 2011.
U.S. Appl. No. 12/885,849 electronically captured on Aug. 1, 2011.
U.S. Appl. No. 12/886,025 electronically captured on Aug. 1, 2011.
U.S. Appl. No. 12/886,123 electronically captured on Aug. 1, 2011.
U.S. Appl. No. 11/399,492 (now U.S. Patent 7,758,223) as of Aug. 1, 2011.
Extended European Search Report issued in EP Appl 10006720.6 on Oct. 13, 2010.
English Language Abstract of JP 61-35216 published Feb. 2, 1986.
IPRP & WO issued in PCT/JP2008/073436 on Aug. 10, 2010.
English Language Abstract of JP 2006-156187 published Jun. 15, 2006.
English Language Translation of JP 2006-156187 published Jun. 15, 2006.
U.S. Appl. No. 13/044,369 electronically captured on Aug. 1, 2011.
U.S. Appl. No. 12/888,921 electronically captured on Aug. 1, 2011.
U.S. Appl. No. 13/172,557 electronically captured on Aug. 1, 2011.
Extended European Search Report issued in EP 111560003.9 on May 18, 2011.
Extended European Search Report issued in EP 08838942.4 on Jun. 1, 2011.
English Languaae Abstract of JP 2008-277561 published on Nov. 13, 2008.
English Language Translation of JP 2008-277561 published on Nov. 13, 2008.
English Language Abstract of JP 2008-227412 published Sep. 25, 2008.
English Language Translation of JP 2008-227412 published Sep. 25, 2008.
U.S. Appl. No. 60/797,146, filed May 2, 2006, Lenk.
Japanese Office Action issued in 2005-269017 on Jan. 13, 2011.
English Language Translation of Japanese Office Action issued in 2005-269017 on Jan. 13, 2011.
English Language Abstract of JP 2004-221042 published Aug. 5, 2004.
English Language Translation of JP 2004-221042 published Aug. 5, 2004.
English Language Abstract of JP 63-102265 published May 7, 1988.
English Language Abstract of JP 2009-206104 published Sep. 10, 2009.
English Language Translation of JP 2009-206104 published Sep. 10, 2009.
European Search Report issued in EP 10178361.1 on Jul. 4, 2011.
Chinese Office Action issued in CN 201010216943 on Oct. 26, 2011.
English Language Translation of Chinese Office Action issued in CN 201010216943 on Oct. 26, 2011.
English Language Abstract of CN 101307887 published Nov. 19, 2008.
English Language Translation of JP 2009/117342 published May 28, 2009.
English Language Abstract of JP 2009/117342 published May 28, 2009.
English Language Abstract of JP 2004-119078 published Apr. 15, 2004.
English Language Translation of JP 2004-119078 published Apr. 15, 2004.
Chinese Office Action issued in CN 201010121809.11 on Mar. 31, 2012.
English Translation of Chinese Office Action issued in CN 201010121809.11 on Mar. 31, 2012.
English Language Abstract and Claims of CN201149860 published Nov. 12, 2008.
English Language Abstract and Claims of CN201072113 published Jun. 11, 2008.
English Language Abstract of CN2602514 published Feb. 4, 2004.
Extended European Search Report for EP 10179580.5, dated May 24, 2012.
Chinese Office Action issued in CN 201010243165.3 on Jul. 17, 2012.

English Language Translation of Chinese Office Action issued in CN 201010243165.3 on Jul. 17, 2012.
English Language Abstract of CN 1264152 published Aug. 23, 2000.
Chinese Office Action issued in CN2010102793033 on Jul. 10, 2012.
English Language Translation of Chinese Office Action issued in CN2010102793033 on Jul. 10, 2012.
English Language Abstract of JP 2005-217354 published Aug. 11, 2005.
English Language Translation of JP 2005-217354 published Aug. 11, 2005.
English Language Abstract of JP 2006-286461 published Oct. 19, 2006.
English Language Translation of JP 2006-286461 published Oct. 19, 2006.
English Language Abstract of WO 2009/085231 published Jul. 9, 2009.
English Language Abstract of CN 1644978 published Jul. 27, 2005.
Chinese Office Action issued in CN 201010292756 dated Jun. 29, 2012.
English Language Translation of Chinese Office Action issued in CN 201010292756 dated Jun. 29, 2012.
English Language Abstract of CN 201014266 published Jan. 30, 2008.
Chinese Office Action issued in CN 201010292760.6 dated Sep. 10, 2012.
English Language Translation of Chinese Office Action issued in CN 201010292760.6 dated Sep. 10, 2012.
English Language Abstract of CN 201081193 published Jul. 2, 2008.
English Language Abstract of CN 1380704 published Nov. 20, 2002.
English Language Abstract of CN 101521140 published Sep. 2, 2009.
English Language Abstract of CN 101506934 published Aug. 12, 2009.
English Language Abstract of CN 201180976 published Jan. 14, 2009.
English Language Abstract of CN 1880844 published Dec. 20, 2006.
Chinese Office Action issued in CN 201010292771.4 dated Jun. 19, 2012.
English Language Translation of Chinese Office Action issued in CN 201010292771.4 dated Jun. 19, 2012.
Japanese Office Action issued in JP2009-219771 on Aug. 9, 2012.
English Language Translation of Japanese Office Action issued in JP2009-219771 on Aug. 9, 2012.
English Language Abstract of JP 2009-164157 published Jul. 23, 2009.
English Language Tranlsation of JP 2009-164157 published Jul. 23, 2009.
Chinese Office Action issued in CN201010287917.6 dated Jun. 27, 2012.
English Language Translation of Chinese Office Action issued in CN201010287917.6 dated Jun. 27, 2012.
English Language Abstract of CN 1433070 published Jul. 30, 2003.
Chinese Office Action issued in CN 201010216943 on Jul. 11, 2012.
English Language Translation of Chinese Office Action issued in CN 201010216943 on Jul. 11, 2012.
Chinese Office Action issued in CN 200910176110.2 dates Jul. 4, 2012.
English Language Translation of Chinese Office Action issued in CN 200910176110.2 dates Jul. 4, 2012.
Japanese Office Action issued in JP 2010-042528 on Nov. 14, 2012.
English Language Translation of Japanese Office Action issued in JP 2010-042528 on Nov. 14, 2012.
English Language Abstract of JP 2010-040223 published Feb. 18, 2010.
English Language Translation of JP 2010-040223 published Feb. 18, 2010.
English Language Abstract of JP 2007-073478 published Mar. 22, 2007.
English Language Translation of JP 2007-073478 published Mar. 22, 2007.
English Language Abstract of JP 2002-093206 published Mar. 29, 2002.
English Language Translation of JP 2002-093206 published Mar. 29, 2002.
Chinese Office Action issued in CN 10121331590 on Nov. 27, 2012.
English Language Translation of Chinese Office Action issued in CN 10121331590 on Nov. 27, 2012.
English Language Abstract of DE 20 2008 016231 published Apr. 9, 2009.
Related U.S. Appl. No. 12/825,650 electronically captured on Feb. 1, 2013.
Related U.S. Appl. No. 12/794,379 electronically captured on Feb. 1, 2013.
Related U.S. Appl. No. 12/794,429 electronically captured on Feb. 1, 2013.
Related U.S. Appl. No. 12/794,476 electronically captured on Feb. 1, 2013.
Related U.S. Appl. No. 12/794,509 electronically captured on Feb. 1, 2013.
Related U.S. Appl. No. 12/811,795 electronically captured on Feb. 1, 2013.
Related U.S. Appl. No. 12/738,081 electronically captured on Feb. 1, 2013.
Related U.S. Appl. No. 12/713,230 electronically captured on Feb. 1, 2013.
Related U.S. Appl. No. 12/825,956 captured on Feb. 1, 2013.
Related U.S. Appl. No. 12/880,490 electronically captured on Feb. 1, 2013.
Related U.S. Appl. No. 12/845,330 electronically captured on Feb. 1, 2013.
Related U.S. Appl. No. 12/885,005 electronically captured on Feb. 1, 2013.
Related U.S. Appl. No. 12/933,969 electronically captured on Feb. 1, 2013.
Related U.S. Appl. No. 12/885,849 electronically captured on Feb. 1, 2013.
Related U.S. Appl. No. 12/886,025 electronically captured on Feb. 1, 2013.
Related U.S. Appl. No. 12/886,123 electronically captured on Feb. 1, 2013.
Related U.S. Appl. No. 13/044,369 electronically captured on Feb. 1, 2013.
Related U.S. Appl. No. 12/888,921 electronically captured on Feb. 1, 2013.
Related U.S. Appl. No. 13/172,557 electronically captured on Feb. 1, 2013.
Related U.S. Appl. No. 13/221,519 electronically captured on Feb. 1, 2013.
Related U.S. Appl. No. 13/221,551 electronically captured on Feb. 1, 2013.
Chinese Office Action issued in CN 201110046965 on Jan. 14, 2013.
English Language Translation of Chinese Office Action issued in CN 201110046965 on Jan. 14, 2013.
English Language Abstract of CN 101639170 published Feb. 3, 2010.
Image File Wrapper of Related U.S. Appl. No. 12/825,650 electronically captured on Apr. 22, 2013.
Image File Wrapper of Related U.S. Appl. No. 12/794,476 electronically captured on Apr. 22, 2013.
Image File Wrapper of Related U.S. Appl. No. 12/794,509 electronically captured on Apr. 22, 2013.
Image File Wrapper of Related U.S. Appl. No. 12/811,795 electronically captured on Apr. 22, 2013.
Image File Wrapper of Related U.S. Appl. No. 12/738,081 electronically captured on Apr. 22, 2013.
Image File Wrapper of Related U.S. Appl. No. 12/845,330 electronically captured on Apr. 22, 2013.
Image File Wrapper of Related U.S. Appl. No. 12/885,849 electronically captured on Apr. 22, 2013.
Image File Wrapper of Related U.S. Appl. No. 13/044,369 electronically captured on Apr. 22, 2013.

* cited by examiner

SELF-BALLASTED LAMP AND LIGHTING EQUIPMENT

INCORPORATION BY REFERENCE

The present invention claims priority under 35 U.S.C. §119 to Japanese Patent Application No. 2010-042528 filed on Feb. 26, 2010. The content of the application is incorporated herein by reference in their entirety.

FIELD

Embodiments described herein relate generally to a self-ballasted lamp using semiconductor light-emitting elements as a light source, and lighting equipment using the self-ballasted fluorescent lamp.

BACKGROUND

In a conventional self-ballasted lamp using LED elements as semiconductor light-emitting elements, a light-emitting module having the LED elements is attached to one end side of a metallic base body and a globe which covers the light-emitting module is attached, a cap is attached to the other end side of the base body, and a lighting circuit is housed inside the base body.

The light-emitting module is a COB (Chip On Board) module in which a plurality of LED elements are directly mounted on a substrate. In the case where a metallic substrate having an excellent thermal conductivity to the base body is used, the constitution is as follows: an insulating layer is formed on one face of the substrate, a wiring pattern is formed on the insulating layer, the plurality of LED elements are attached onto the insulating layer by adhesive, the LED elements and the wiring pattern are electrically connected to each other by wire-bonding, and all the plurality of LED elements are covered with sealing resin in which a phosphor is mixed.

Additionally, the substrate is screwed and fixed to and brought into close contact with the base body so that heat is excellently conducted from the substrate of the light-emitting module to the base body.

In a light-emitting module which adopts a COB module method, LED elements are mounted onto the substrate in a manner that the insulating layer is formed on one face of the substrate and the plurality of LED elements are attached onto the insulating layer by adhesive. However, for improvement in thermal conductivity from the LED elements to the substrate, and for constituting the light-emitting module at a low cost by simplifying manufacturing processes of the light-emitting module, it is considered to leave out the insulating layer and attach the plurality of LED elements to one face of the metallic substrate by adhesive.

In the case of this mounting method, the substrate electrically comes into contact with the base body and metallic screws for fixing the substrate to the base body electrically come into contact with the substrate and the base body. However, the electrical contact causes no problem because an insulation distance between the substrate and each LED element and the wire of wire-bonding is secured in a normal use condition. However, in the case where high voltage is applied to the LED elements and the wire of wire-bonding and discharge is performed between the substrate and the LED elements and the wire when, for example, the lighting circuit abnormally operates, there is a possibility that current flows in the base body, which is exposed to the outside, through the substrate and the screws in which current flows.

It is an object of the present invention to provide a self-ballasted lamp which, even when an abnormal state occurs such that current flows in the substrate, can reliably prevent the current from flowing in the base body, and lighting equipment using the self-ballasted lamp.

DETAILED DESCRIPTION

Figure 1:
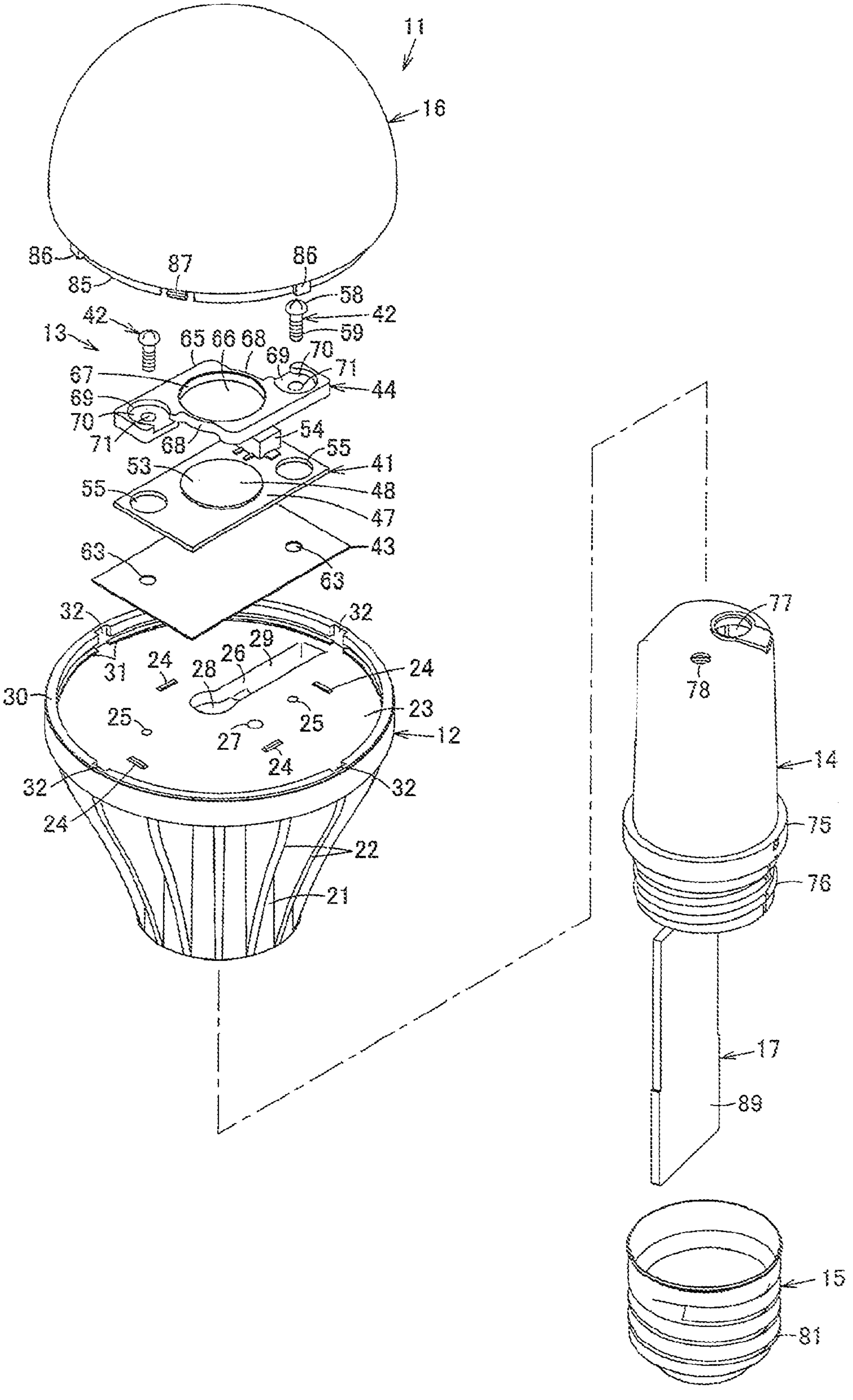
FIG. 1 is a perspective view of a disassembled self-ballasted lamp of a first embodiment.

A self-ballasted lamp of this embodiment includes a light-emitting module, a base body, a first insulating member, screws, a second insulating member, a cap and a lighting circuit. The light-emitting module has a light-emitting portion including semiconductor light-emitting elements mounted on a surface of a metallic substrate. The base body is made of metal, and the light-emitting module is arranged on one end side of the base body. The first insulating member is interposed between the substrate of the light-emitting module and the base body. The screw is made of metal and the substrate of the light-emitting module is fixed to the base body with the screw. The second insulating member is interposed between the screws and the substrate of the light-emitting module. The cap is provided at the other end side of the base body. The lighting circuit is housed inside the base body.

The substrate of the light-emitting module may be made of, for example, metal such as aluminum, and no insulating layer is here permitted to be formed on one face, on which the semiconductor light-emitting elements are mounted, of the substrate. As the semiconductor light-emitting elements, for example, an LED element or EL element is usable. When, for example, an LED element is used as the semiconductor light-emitting element, the light-emitting module may be a COB (Chip On Board) module in which a plurality of LED elements are directly mounted on the substrate, or a module in which an SMD (Surface Mount Device) type package is mounted on the substrate.

The base body is made of, for example, metal such as aluminum, and heat radiating fins for improving heat radiation performance may be provided on an outer circumference face of the base body.

The first insulating member is preferably a sheet which is made of, for example, silicone resin or silicone rubber and has insulativity, heat conductivity and elasticity, but it is not limited to this sheet. When the sheet is used, the elasticity of the sheet allows the substrate and the base body to more firmly come into close contact with each other.

The screw has a head portion and a screw shaft portion which has a thread, and one or more screws are used.

The second insulating member is made of, for example, synthetic resin having insulativity, and may be provided to interpose between the screw and the substrate at an engaging portion of the screw at least. Additionally, when the plurality of screws are used, one part may be constituted by forming a plurality of engaging portions integrally.

As the cap, for example, a cap connectable to a socket for an E26 type or E17 type general lighting bulb is usable.

The lighting circuit has, for example, a source circuit for outputting DC power of constant current and can supply power to the semiconductor light-emitting elements in a manner that a wire connected to an output side of the source circuit is led out to one end side through the inside of the base body and a connector at a top end of the wire is connected to a connector arranged on the substrate. Although the lighting circuit is housed inside the base body, apart of the lighting circuit may be housed inside the cap.

Next, a first embodiment will be described with reference to FIGS. 1 to 6.

FIGS. 1 to 6 show the first embodiment. As shown in FIGS. 1 to 4, a self-ballasted lamp 11 includes: a metallic base body 12; a light-emitting module unit 13 attached to one end side (one end side of a lamp axis of the self-ballasted lamp 11) of the base body 12; an insulating cover 14 which is attached to the other end side of the base body 12; a cap 15 attached to the other end side of the cover 14; a light-transmissive globe 16 which is attached to one end side of the base body 12 so as to cover the light-emitting module unit 13; and a lighting circuit 17 housed inside the cover 14 between the base body 12 and the cap 15.

The base body 12 is integrally formed of, for example, metal such as aluminum excellent in thermal conductivity, a body portion 21 opened to the other end side is formed in a center region of the base body 12, and a plurality of heat radiating fins 22 are formed on the circumference of the body portion 21 along the lamp axis so as to radially project. The heat radiating fin 22 is obliquely formed so that the amount of projection of the fin 22 in a radial direction from the other end side to one end side of the base body 12 gradually increases. The heat radiating fins 22 are shaped so as to approximate the shape of a bulb when being coupled to the globe 16.

A flat attachment face 23, to which the light-emitting module unit 13 is attached, is formed in one face of one end side of the base body 12. There are formed on and in the attachment face 23: a plurality of positioning projections 24 for positioning an insulating sheet described below of the light-emitting module unit 13; a plurality of attachment holes 25 into which the light-emitting module unit 13 is screwed; and a wiring hole 26 through which a connector and a lead wire for electrically connecting the lighting circuit 17 to the light-emitting module unit 13 pass. Further, an attachment hole 27, into which the cover 14 arranged inside the body portion 21 is screwed from the inside of the cover 14, is penetrably formed in the base body 12.

On one end side of the base body 12, a hole portion 28 for making the attachment face 23 of the base body 12 communicate with the inside of the body portion 21 located at the other end side is formed slightly away from the lamp axis along a lamp axis direction, and a groove portion 29, which extends from the hole portion 28 to a circumferential region of the base body 12, is communicatively formed in the attachment face 23 of the base body 12. The wiring hole 26, through which the connector and the lead wire for electrically connecting the lighting circuit 17 to the light-emitting module unit 13 side pass, is formed by the hole portion 28 and the groove portion 29.

In the circumferential region of one end side of the base body 12 an annular globe attachment portion 30, to which the globe 16 is attached, is formed in a projecting manner. In an inner circumferential portion of the globe attachment portion 30, a locking groove 31 is formed, at a position which is away from a top end of the globe attachment portion 30 and near the attachment face 23, over the entire inner circumferential portion, and rotation stopping grooves 32 are formed, at a plurality of locations, for example, four positions which are located at even intervals along a circumferential direction of the globe attachment portion 30, in the lamp axis direction.

The light-emitting module unit 13 includes: a light-emitting module 41; a plurality of screws 42 for fixing the light-emitting module 41 to the base body 12; an insulating sheet 43 as a first insulating member interposed between the light-emitting module 41 and the base body 12; and an insulating collar 44 as a second insulating member which is arranged on the light-emitting module 41 and interposed between the screws 42 and the light-emitting module 41.

The light-emitting module 41 has a rectangular substrate 47 made of, for example, metal such as aluminum, and a circular light-emitting portion 48 formed in a center region of amounting face which is one face of one end side of the substrate 47.

Figure 5:
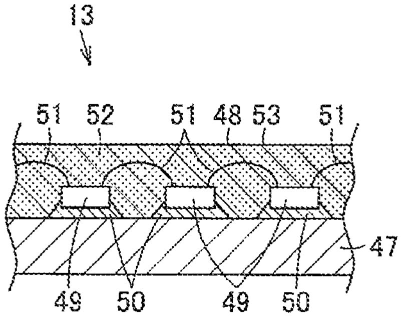
FIG. 5 is a cross sectional view of a part of the light-emitting module of the self-ballasted lamp.

As shown in FIG. 5, as the light-emitting portion 48, a COB (Chip On Board) method is adopted in which the LED chips 49, which are LED elements as a plurality of semiconductor light-emitting elements, are mounted on a metal face of the substrate 47. That is, pieces of adhesive 50 such as silicone resin are applied corresponding to each mounting position at predetermined intervals, at which the plurality of LED chips 49 are arranged in a matrix, on the metal face of the substrate 47, each LED chip 49 is pressed and adhesively fixed to each piece of the adhesive 50, the adjacent LED chips 49 are electrically connected in series to each other by a wire 51 by wire-bonding treatment, and all the plurality of LED chips 49 are covered and sealed with sealing resin 52 which is, for example, transparent resin such as silicone resin in which a phosphor is mixed.

An LED chip emitting, for example, blue light is used as the LED chip 49, and a phosphor, which is excited by a part of the blue light from the LED chips 49 and radiates yellow light, is mixed in the sealing resin. Accordingly, the light-emitting portion 48 is constituted by the LED chips 49, the sealing resin 52, etc., a surface of the sealing resin 52, which is a surface of the light-emitting portion 48, serves as a light-emitting face 53, and illumination light of white electroluminescence is radiated from the light-emitting face 53.

A wiring pattern (not shown) is formed on the mounting face of the substrate 47 in a state of being insulated from the substrate 47. To this wiring pattern, each end portion of the wires 51 connecting the plurality of LED chips 49 in series to each other is connected and a connector 54 mounted at one corner portion on the substrate 47 is connected.

Insertion holes 55, in which the screws 42 are inserted, are formed at two corner portions on a diagonal, on which the connector 54 is not mounted, of the substrate 47. The insertion holes 55 are formed coaxially with the attachment holes 25 of the base body 12 respectively, and each has a diameter larger than that of the screw 42, and an insulation distance between each screw 42 inserted in the center of the insertion hole 55 and the substrate 47 is secured.

The screw 42 is made of metal and has a head portion 58 and a screw shaft portion 59 in which a thread is formed. When the light-emitting module 41 is fixed to the base body 12, a washer 60 is used in which the screw shaft portion 59 is inserted.

The insulating sheet 43 is a thin sheet which is made of, for example, silicone resin or silicone rubber and has insulativity, heat conductivity and elasticity. Insertion holes 63, in each of which the screw shaft portion 59 of the screw 42 is inserted, are formed at positions coaxial with the respective attachment holes 25 of the base body 12 and the respective insertion holes 55 of the substrate 47.

The insulating collar 44 is made of, for example, insulating synthetic resin such as PBT resin, is formed so as to be not larger than the outer form of the substrate 47, and has a collar body 65 to be adhered onto the substrate 47. A circular opening portion 66, through which the light-emitting portion 48 is exposed, is formed in a center region of the collar body 65, and an annular wall portion 67, which is arranged at a circumferential region on the light-emitting portion 48, is formed by the circumference of the opening portion 66.

Figure 2:
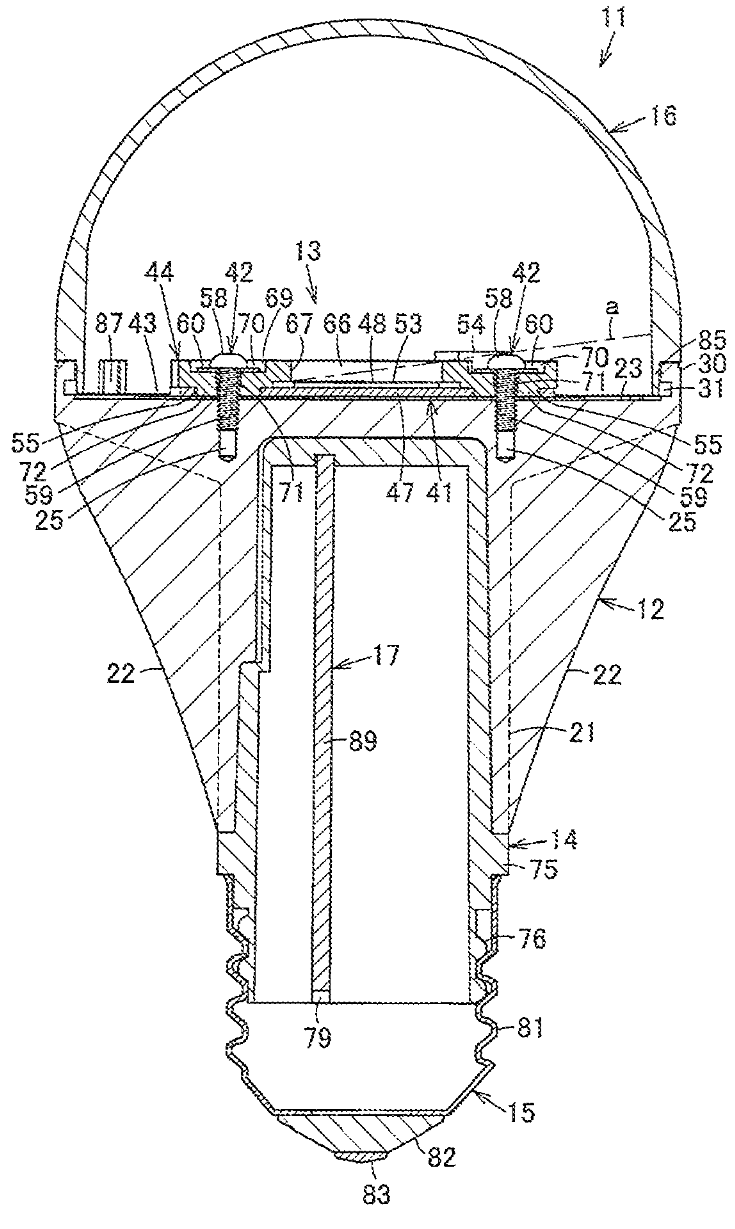
FIG. 2 is a cross sectional view of the self-ballasted lamp.
Figure 3:
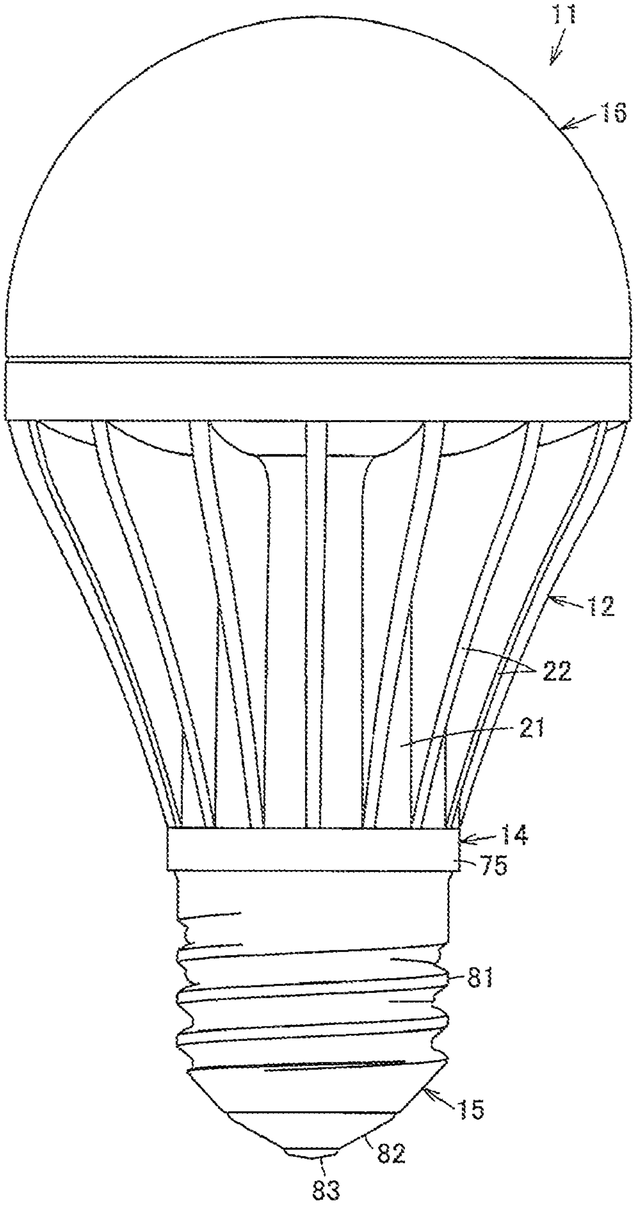
FIG. 3 is a side view of the self-ballasted lamp.
Figure 4:
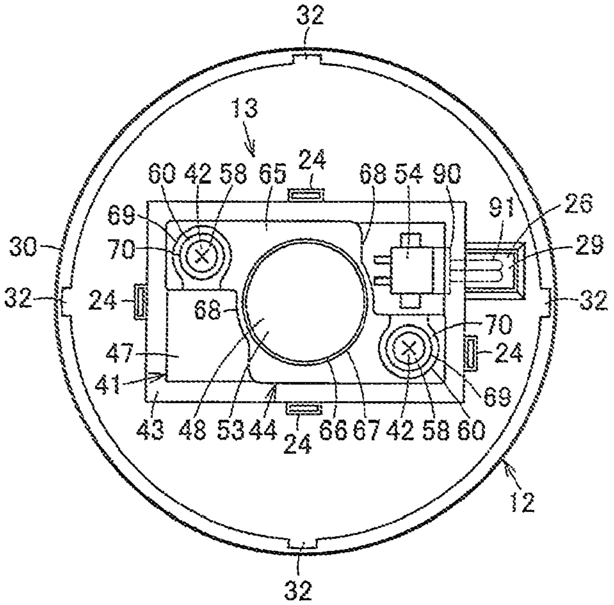
FIG. 4 is an end view of a base body and a light-emitting module of the self-ballasted lamp.

As shown in FIG. 2, the height dimension of the wall portion 67 from the substrate 47 is set so that shadows of the connector 54 arranged on the substrate 47 and the head portion 58 of the screw 42 can be prevented from being reflected on the globe 16 and a virtual line a connecting an end portion of the light-emitting portion 48 to an upper end, which is located opposite from the end, of the wall portion 67 does not cross the connector 54 and the head portion 58 of the screw 42. Moreover, although the virtual line a seems to cross the connector 54 in FIG. 2, this seemingly only appears due to the direction of a cross section, and actually, the virtual line a does not cross the connector 54 in a cross section passing the location of the connector 54.

Notch portions 68 for preventing interference with the connector 54 are formed at corner portions, which are located on one diagonal, of the four corners of the collar body 65, and screw engaging portions 69 for engaging with the screws 42 are formed at corner portions located on the other diagonal.

At one face side of the screw engaging portion 69, there are formed: a recessed portion 70 with and in which the head portion 58 of the screw 42 and the washer 60 are engaged and housed; and an insertion hole 71 in which the screw shaft portion 59 of the screw 42 is inserted. Positioning projecting portions 72 to be fitted in the insertion holes 55 of the substrate 47 are formed at the other face sides of the screw engaging portions 69. The recessed portion 70, insertion hole 71 and positioning projecting portion 72 of the screw engaging portion 69 are formed coaxially with each attachment hole 25 of the base body 12, each insertion hole 55 of the substrate 47 and the insertion hole 63 of the insulating sheet 43.

The cover 14 is made of, for example, an insulating material such as PBT resin, and cylindrically formed so as to be opened to the other end side. An annular flange portion 75, which is interposed between the base body 12 and the cap 15 to insulate them from each other, is formed in an outer circumferential portion of the other end side of the cover 14, and a screw-engaging portion 76 having a thread, to which the cap 15 is screw-engaged and attached, is formed on the other end side in relation to the flange portion 75. In a face of one end side of the cover 14, a wiring hole 77 is formed which communicates coaxially with the hole portion 28 of the wiring hole 26 of the base body 12 and through which the connector and the lead wire pass, and an insertion hole 78 is formed which communicates coaxially with the attachment hole 27 of the base body 12 and is fixed to the attachment hole 27 via a screw. A pair of substrate attachment grooves 79 facing each other is formed in an inner circumferential face of the cover 14 at a position offset from the center of the cover 14 along the lamp axis direction.

The cap 15 is, for example, a cap which is connectable to an E17 type or E26 type general bulb, and has a shell 81 screw-engaged with and fixed to the screw-engaging portion 76 of the cover 14, an insulating portion 82 provided at the other end side of the shell 81 and an eyelet 83 provided at a top portion of the insulating portion 82.

The globe 16 is made of synthetic resin, glass or the like having light-diffuseness and formed in a hemisphere shape. The other end side of the globe 16 is opened, and a fitting portion 85, which is fitted in the inner circumference side of the globe attachment portion 30 of the base body 12, is formed in the opening edge portion of the globe 16. A plurality of rotation stopping projections 86 to be fitted into the respective rotation stopping grooves 32 of the globe attachment portion 30 are formed on the fitting portion 85. A plurality of locking claws 87, which are locked to the locking groove 31 of the globe attachment portion 30 when the fitting portion 85 is fitted in the globe attachment portion 30, are formed on the fitting portion 85.

The lighting circuit 17 is a circuit for supplying constant current to the LED chips 49 of the light-emitting module 41 and has a circuit substrate 89 on which a plurality of circuit elements constituting the circuit are mounted. The circuit substrate 89 is inserted in the substrate attachment grooves 79 of the cover 14, and thus the lighting circuit 17 is housed inside the cover 14. The shell 81 and the eyelet 83 of the cap 15 are electrically connected to an input side of the lighting circuit 17 via lead wires. A lead wire 91 having a connector 90 at its top end is connected to an output side of the lighting circuit 17, the connector 90 and the lead wire 91 are led out to one end side of the base body 12 through the wiring hole 77 of the cover 14 and the wiring hole 26 of the base body 12, and the connector 90 is connected to the connector 54 of the light-emitting module 41. Moreover, connection of the connector 90 is performed before the light-emitting module 41 is screwed to the base body 12.

For assembling the self-ballasted lamp 11, the cover 14 is first inserted in the body portion 21 of the base body 12 and then screwed to the attachment hole 27 of the base body 12 through the insertion hole 78 from the inside of the cover 14. Then, the circuit substrate 89 of the lighting circuit 17 is inserted inside the cover 14, and the connector 90 and the lead wire 91 are led out to one end side of the base body 12 through the wiring hole 77 of the cover 14 and the wiring hole 26 of the base body 12. Then, the cap 15 is screw-engaged with the screw-engaging portion 76 of the cover 14 and fixed to the cover 14 by adhesion or caulking.

Then, the light-emitting module unit 13 is attached to the base body 12. That is, the insulating sheet 43 is positioned and arranged between the plurality of positioning projections 24 projecting from the attachment face 23 of the base body 12, the substrate 47 of the light-emitting module 41 is arranged on the insulating sheet 43 and covers the substrate 47 with the insulating collar 44, each positioning projecting portion 72 is fitted and positioned in the insertion hole 55 of the substrate 47, the screw shaft portion 59 of each screw 42, on which the washer 60 is fitted, is screw-engaged with the attachment hole 25 of the base body 12 through each recessed portion 70 and insertion hole 71 of the insulating collar 44, the insertion hole 55 of the substrate 47 and the insertion hole 63 of the insulating sheet 43, the screw 42 is tightened, and the insulating collar 44, the light-emitting module 41 and the insulating sheet 43 are fixed to the base body 12. Additionally, the connector 90 and the lead wire 91, which are led out to one end side of the base body 12 in advance, are led out from an opened portion, where the end portion of the groove portion 29 of the wiring hole 26 is exposed from the edge portions of the insulating sheet 43 and the substrate 47 and the connector 90 is connected to the connector 54 of the light-emitting module 41 after attachment of the light-emitting module unit 13. Thus, the substrate 47 of the light-emitting module 41 is brought into close face-contact with and attached to the attachment face 23 of the base body 12 via the insulating sheet 43, and the center of the light-emitting portion 48 of the light-emitting module 41 is arranged on the center of the lamp axis. Moreover, the attachment order of the light-emitting module unit 13 to the base body 12 is not limited to the above order, and another attachment order is possible.

Then, adhesive made of silicone resin, cement or the like is applied to the inner circumference of the globe attachment portion 30 of the base body 12, each rotation stopping projection 86 of the globe 16 is positioned so as to correspond to each rotation stopping groove 32 of the globe attachment portion 30, the globe 16 is adhered to the base body 12, and thus, each locking claw 87 of the globe 16 is locked to the locking groove 31 of the globe attachment portion 30 and the globe 16 is fitted and fixed into the base body 12. Thus, the globe 16 neither rotates in relation to nor comes out from the base body 12. The globe 16 is fixed to the base body 12 by adopting such a fitting-locking method. Therefore, when the above method is used together with adhesive, the amount of adhesive used can be reduced compared with that of a conventional method. Alternatively, even when no adhesive is used, the globe 16 can be reliably fixed to the base body 12.

Figure 6:
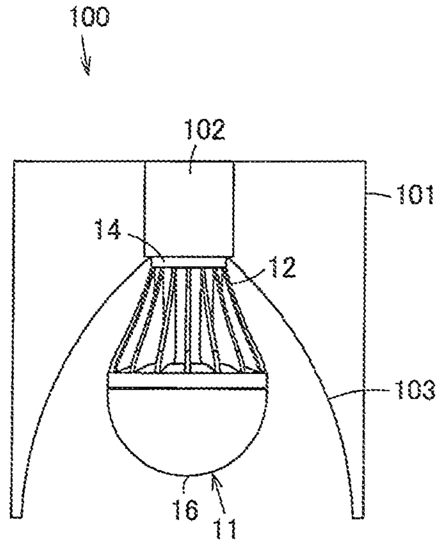
FIG. 6 is a cross sectional view of lighting equipment using the self-ballasted lamp.

FIG. 6 shows lighting equipment 100 which is a downlight using the self-ballasted lamp 11, the lighting equipment 100 has an equipment body 101, and a socket 102 and a reflection body 103 are disposed in the equipment body 101.

When the self-ballasted lamp 11 attached to the socket 102 of the lighting equipment 100 is energized, the lighting circuit 17 operates, lighting power is supplied to the plurality of LED chips 49 of the light-emitting module 41, the plurality of LED chips 49 emit light and the light is diffused and radiated through the globe 16.

Heat generated when the plurality of LED chips 49 of the light-emitting module 41 are lit is mainly conducted to the substrate 47 and then conducted to the base body 12 via the insulating sheet 43 from the substrate 47, and radiated into air from a surface of the base body 12 having the plurality of heat radiating fins 22.

Since, in the light-emitting module 41, the LED chips 49 are directly mounted on the metallic substrate 47 by the pieces of adhesive 50 without a separately interposed insulating layer, heat of the LED chips 49 can be efficiently conducted to the substrate 47. Additionally, since heat can be conducted from the whole face of the substrate 47 wider than the light-emitting portion 48 to the base body 12 via the insulating sheet 43 although the insulating sheet 43 is interposed between the substrate 47 and the base body 12, high thermal conductivity can be secured.

If the lighting circuit 17 abnormally operates, high voltage is applied to the LED chips 49 and the wires 51 of the light-emitting module 41 and discharge is performed between the LED chips 49 and wires 51 and the substrate 47, and it is considered that there is the possibility that current flows in the substrate 47. In this case, even when current flows in the substrate 47, the current can be reliably prevented from flowing in the base body 12, because the insulating sheet 43 is interposed between the substrate 47 and the base body 12 and the insulating collar 44 is interposed between the screws 42 for fixing the substrate 47 to the base body 12 and the substrate 47.

Since the positioning projecting portions 72 to be fitted in the insertion holes 55 of the substrate 47 are provided on the insulating collar 44, a positional relationship between the insulating collar 44 and the substrate 47 can be determined by combining them, the screw 42 is always arranged at the center of the insertion hole 55 of the substrate 47 and the insulation distance between each screw 42 and the substrate 47 can be reliably secured.

Additionally, since the wall portion 67 surrounding the light-emitting portion 48 of the substrate 47 is provided in the insulating collar 44, light advancing along one face of the substrate 47 from the light-emitting portion 48 is blocked by the wall portion 67, the shadows of the connector 54 arranged on the substrate 47 and the screws 42 can be prevented from being reflected on the globe 16 and the insulating collar 44 can also serve as a shielding body. Further, the inner circumference face of the wall portion 67 functions as a reflection face so that light can be effectively used and light distribution control can be performed.

Figure 7:
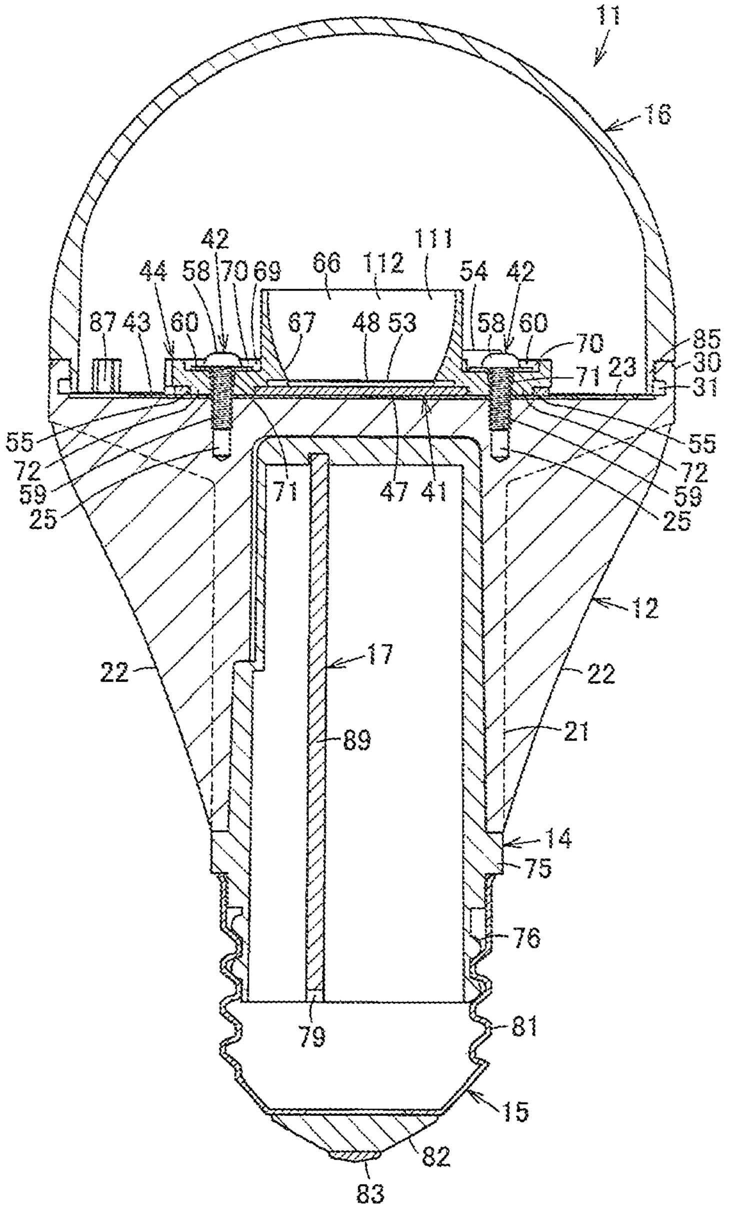
FIG. 7 is a cross sectional view of a self-ballasted lamp of a second embodiment.

FIG. 7 shows a second embodiment.

The reflection face function of the inner circumference face of the wall portion 67 of the insulating collar 44 is further enhanced, a reflecting portion 111, which faces the circumference of the light-emitting portion 48 on the substrate 47 and reflects light from the light-emitting portion 48, is formed on the wall portion 67. The reflecting portion 111 is cylindrical, and in the inner circumferential face, which faces the light-emitting portion 48, of the reflecting portion 111, a reflecting face 112 of which the diameter becomes larger on the farther side of one end side is formed. For example, aluminum is vapor-deposited on the reflecting face 112, so as to secure a high reflectance performance.

The reflecting portion 111, which faces the circumference of the light-emitting portion 48 on the substrate 47 to reflect light from the light-emitting portion 48, is thus provided on the insulating collar 44. Accordingly, when such an insulating collar 44 is used for the lighting equipment 100 which is the downlight shown in FIG. 6, light distribution control suitable for the lighting equipment 100, that is, an increase in light distribution perpendicularly downward, can be realized and the insulating collar 44 can also serve as a reflection body.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A self-ballasted lamp comprising:

a base body comprising a first end side comprising a screw attachment portion and a second end side;

a light-emitting module comprising a substrate and a light-emitting portion disposed on a surface of the substrate, the a light-emitting portion comprising a semiconductor light-emitting element mounted thereon, the light-emitting portion comprising a circumferential region;

an insulating member comprising a screw insertion portion and an opening portion through which the light-emitting portion is exposed, the opening portion engaging the circumferential region of the light-emitting portion to position the light-emitting module;

a screw disposed in the screw insertion portion and attached to the screw attachment portion;

a lighting circuit provided at the second end side of the base body; and a cap provided at the second end side of the base body.

2. The self-ballasted lamp according to claim 1, further comprising a second insulating member interposed between the screw and the substrate of the light-emitting module, the second insulating member comprising a plurality of positioning projecting portions fitting the second insulating member to the substrate at a plurality of locations.

3. The self-ballasted lamp according to claim 1, wherein:
the substrate is made of metal; and
the insulating member is interposed between an end side of the substrate opposite the one end side and the base body.

4. The self-ballasted lamp according to claim 3, wherein the substrate is attached in close face-contact via the first insulating member to a base body attachment face which is attached to the base body.

5. The self-ballasted lamp according to claim 1, further comprising a globe attached to the first end side of the base body and covering the light-emitting module, wherein the insulating member includes a wall portion surrounding a circumference of the light-emitting portion.

6. The self-ballasted lamp according to claim 5, wherein a virtual line connecting an end portion of the light-emitting portion to an upper end of the insulating member which is located opposite from the end does not intersect the screw.

7. The self-ballasted lamp according to claim 1, wherein:
a plurality of semiconductor light-emitting elements of the light-emitting portion are arranged on one end side of the substrate in a matrix; and
each of the plurality of the semiconductor light-emitting elements is covered and sealed with a sealing resin in which a phosphor is mixed.

8. The self-ballasted lamp according to claim 7, further comprising a second insulating member interposed between the screw and the light-emitting module, wherein:
the semiconductor light-emitting elements comprise a blue semiconductor light-emitting element emitting blue light;
the phosphor comprises a yellow phosphor excited by a part of the blue light of the semiconductor and radiating yellow light;
one light-emitting portion is formed in a center region of the one side of the substrate; and
one opening portion is formed in a center region of the second insulating member.

9. The self-ballasted lamp according to claim 1, wherein a plurality of a positioning projections are formed on a face of the base body.

10. The self-ballasted lamp according to claim 1, further comprising:
a second insulating member interposed between the screw and the light-emitting module;
a connector mounted on one end side of the substrate; and
a wiring from the lighting circuit connected to the connector;
wherein the second insulating member comprises a notch portion formed corresponding to a mounting position of the connector.

11. The self-ballasted lamp according to claim 1, wherein:
the lighting circuit is attached to the base body via a cover of resin;
a wiring hole is formed in one end side of the cover;
a connector is mounted on one end side of a substrate; and
a wiring from the lighting circuit is connected to connector and passes through the wiring hole.

12. The self-ballasted lamp according to claim 1, further comprising a second insulating member interposed between the screw and the light-emitting module, wherein:
the screw includes a screw head portion and a screw shaft portion;
the second insulating member comprises a recessed portion containing the screw head portion at one face side and a screw insertion portion in which the screw shaft portion is disposed;
a positioning projecting portion is formed on one end side of the substrate; and
the recessed portion, the screw insertion portions, and the positioning projecting portion are positioned coaxially with a screw attachment portion.

13. The light equipment comprising;
an equipment body; and
the self-ballasted lamp according to claim 1 attached to the equipment body.

* * * * *